UNITED STATES PATENT OFFICE.

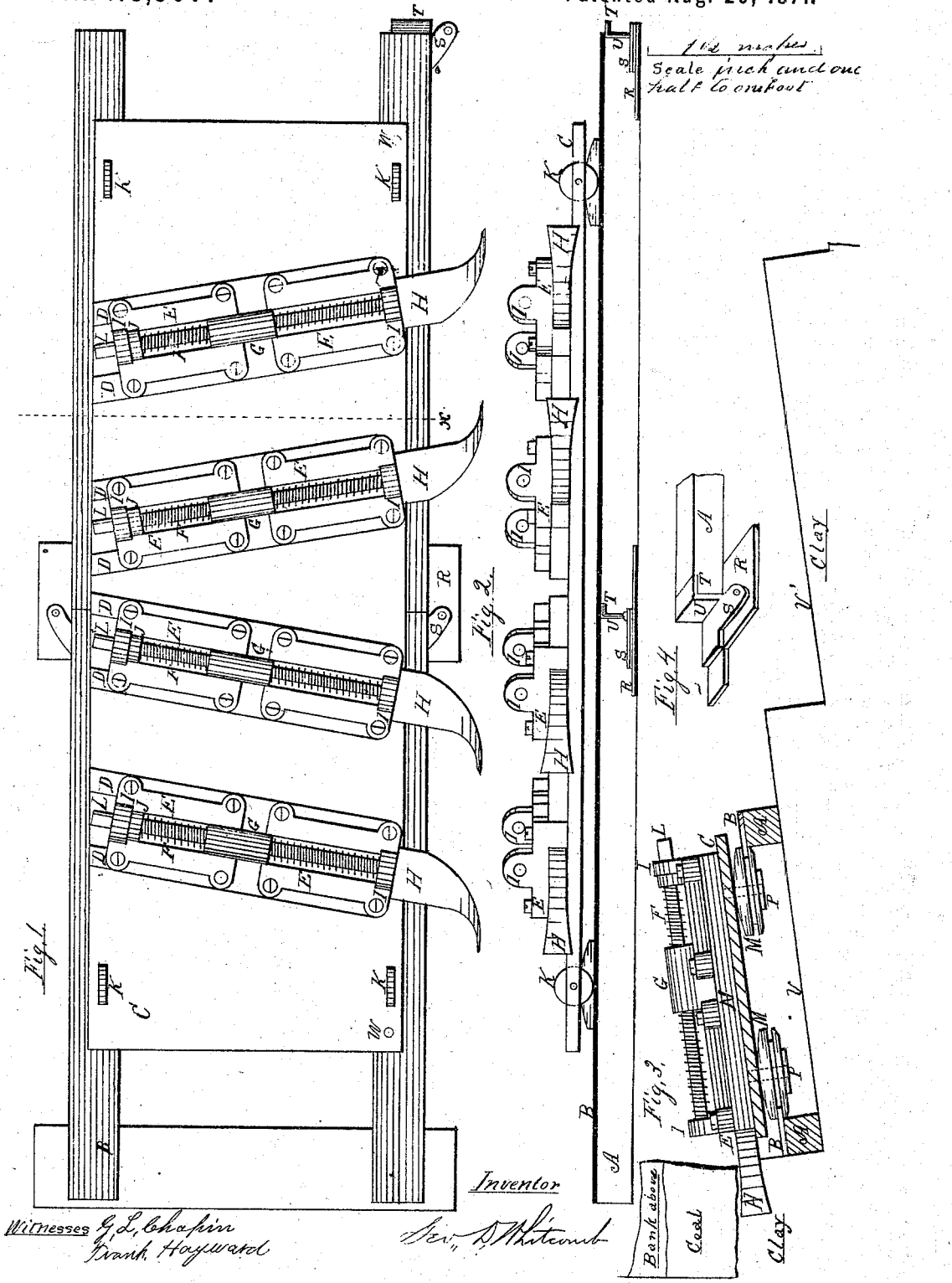

GEORGE D. WHITCOMB, CHICAGO, ILLINOIS.

IMPROVEMENT IN MACHINES FOR UNDERMINING COAL.

Specification forming part of Letters Patent No. 118,501, dated August 29, 1871.

*To all whom it may concern:*

Be it known that I, GEORGE D. WHITCOMB, of Chicago, in the county of Cook and State of Illinois, have invented a new and useful Machine for Undermining Coal and other Minerals; and I do hereby declare the following to be a full, clear, and exact description thereof, reference being had to the accompanying drawing making a part of this specification, in which—

Figure 1 is a plan or top view of my machine. Fig. 2 is a front elevation thereof with the adjusting-screws removed. Fig. 3 is a cross-section in the line marked $x$, Fig. 1, and also showing the position of the machine when in operation; and Fig. 4 is an enlarged view in perspective of the devices I employ for connecting and holding in position the contiguous ends of the tram-rails.

Like letters of reference indicate like parts in each.

My invention relates to the construction of a machine to be used in mining operations and more particularly designed for "bearing in" or undermining, though also applicable to other uses. In it a series of adjustable cutters cutting in opposite directions is mounted in a reciprocating carriage, which latter moves on ways back and forth parallel with the line of cutting to be done, substantially as hereinafter more fully set forth.

To enable others skilled in the art to make and use my improvement, I will proceed to describe its construction and mode of operation.

A suitable track is laid parallel with the line of cutting to be done. This consists preferably of wooden stringers, A, to the top of which are fastened the flat rails B. On these rails the bed or frame C is operated by truck-wheels K. To resist transverse strain or pressure I arrange under the frame C the grooved horizontal rollers M, which play against the projecting edges of the rails B, as shown in Fig. 3. The track, for convenience in moving, is made in sections, and these are jointed and fastened in place by means of the metallic plates R and angle-irons S T U, which jointing device, however, will form the subject matter of a separate application. For the purpose of undermining I employ a series of cutters, H H, the shanks N of which are mounted on and across the frame C, so that they run straight across or at an angle to the side of the frame. The points or "bits" of these cutters are turned some one way and some the other, so that the work of cutting may be carried on at each stroke or movement of the machine, the machine being caused to operate by means of any suitable known devices for securing a reciprocating motion back and forth on the track B. The shanks N are set between the guides D and under the caps E, but in such manner that they may be adjusted out or in at pleasure. From each shank rises a stem, on the upper end of which is a tapped nut, G, through which passes the threaded screw F. This screw has its bearings in the ears I, (which are cast onto the cap E,) but so that the screw shall have only a rotary motion. Each screw is turned by a wrench applied to a square head, L, or in any other suitable way, whereby the nut G is carried along lengthwise of the screw, carrying with it, of course, the shank N, and consequently adjusting each cutter H in or out, as may be desired. The screws which fasten the caps E in place may also pass through the guides D and into the frame C.

The cutting-line of the face of the mine is first to be cleared and then the track is to be laid on an inclined bench, V', properly prepared. The cutters being adjusted to the work, the machine is made to traverse back and forth on the track along the line of cutting, so that the knives shall cut their way in, with a planing action, at each stroke or travel of the machine. As they gradually cut their way in they are set further out by means of the screws F, as already set forth. Having cut or undermined to the required depth or to the extent of their available length, the coal or other mineral is removed and the work resumed on the new bench V as formed by the last cutting. This feature of mining, by cutting a series or succession of inclined benches, will form the subject-matter of a separate application. It will be observed that the cutters H, with their shanks N, are not only adjustable, but also removable, so that one set having cut to the extent of their available length, another set, having greater length from the nut G outward, may be substituted and the work of cutting go on as before. This under-cutting or "bearing in" may be done in the lower part of the stratum of coal, or in the clay or rock under the same.

What I claim as my invention, and desire to secure by Letters Patent, is—

A coal-mining machine adapted to move on ways back and forth, and having adjustable cutters arranged to plane and under-cut the coal, substantially as set forth.

GEO. D. WHITCOMB.

Witnesses:
FRANK HAYWARD,
G. L. CHAPIN.